United States Patent [19]

Harmon

[11] Patent Number: 4,929,078

[45] Date of Patent: May 29, 1990

[54] CONVERSION OF DUAL WAVE BEAM SPECTROPHOTOMETER TO DUAL WAVELENGTH SPECTROPHOTOMETER

[75] Inventor: Harold J. Harmon, Edmond, Okla.

[73] Assignee: Oklahoma State University, Stillwater, Okla.

[21] Appl. No.: 269,964

[22] Filed: Nov. 10, 1988

Related U.S. Application Data

[63] Continuation-in-part of Ser. No. 35,963, Apr. 8, 1987, abandoned.

[51] Int. Cl.⁵ .............................................. G01J 3/427
[52] U.S. Cl. ..................................... 356/320; 356/326
[58] Field of Search ............... 356/319, 320, 323, 324, 356/325

[56] References Cited

U.S. PATENT DOCUMENTS 3,712,738  1/1973  Yamamoto ........................... 356/320
3,927,944  12/1975  Iwahashi et al. ..................... 356/320
4,661,711  4/1987  Harjunmaa ........................... 356/417

FOREIGN PATENT DOCUMENTS

0207019  10/1985  Japan ..................................... 356/319

Primary Examiner—F. L. Evans
Attorney, Agent, or Firm—Mark E. Ogram

[57] ABSTRACT

A conversion and kit for a dual beam spectrophotometer permitting it to operate in dual wavelength mode and thereby obtaining resolution heretofore unavailable from similar machines. The present invention provides for a second light source and directs it through the sample. By eliminating the reference path of the dual beam machine, the second light source permits the converted dual beam spectrophotometer to work in dual wavelength mode and thereby generate higher resolution while using the same instrument. The conversion allows the spectrophotometer to be operated in dual beam mode and for the easy/rapid changing between dual beam and dual wavelength modes.

15 Claims, 4 Drawing Sheets

CONVERSION OF DUAL WAVE BEAM SPECTROPHOTOMETER TO DUAL WAVELENGTH SPECTROPHOTOMETER

This is a continuation-in-part on U.S. patent application No. 035,963, entitled "Dual Wavelength Converter for Dual Beam Spectrophotometer", filed Apr. 8, 1987, now abandoned.

BACKGROUND

This invention relates in general to spectrophotometers and, in particular, to a dual wavelength converter for a dual beam instrument.

A spectrophotometer is an instrument for measuring light transmitted through a substance. Based upon such measurements, properties of the substance can be determined, for example, concentration.

There are two types of spectrophotometers. One type is called a split beam or a dual beam spectrophotometer. Such spectrophotometers consist of a single monochromator light source of a given wavelength or wavelengths. The light from the source is divided into two separate beams that pass along separate optical paths. One optical path leads one beam through a reference; the other optical path leads the other beam through a sample. The reference does not contain any material but is used to measure or compare the sample beam against a common background. As such, the reference beam represents no change, 100 percent light transmission and zero absorption. In contrast, the sample will absorb some light and transmit the rest. The two beams are alternately transmitted along their respective paths. These paths terminate in a common photodetector. The photodetector includes a processing network for separately processing the alternate signals received at the detector from the reference path and the sample path.

Dual or split beam spectrophotometers are widely used because they are relatively inexpensive and provide reliable spectrophotometric information for many applications. However, they have certain shortcomings when measurements are undertaken on samples having high turbidity that tends to scatter rather than absorb incident light.

The other type of spectrophotometer is known as a dual wavelength instrument. Dual wavelength spectrophotometers use two, independent beams of light generated by two separate and distinct monochromators set at different wavelengths. These two beams of light are alternately transmitted along optical path or paths to the sample material. Electronic circuits measure the difference in absorption between the two beams. Information may be derived based upon the different output depending upon the relative difference in wavelengths of the two incident beams. Unlike the dual beam spectrophotometer, the dual wavelength spectrophotometer does not include a reference optical path. Instead, both of the distinct wavelength beams are transmitted to the sample.

Dual wavelength spectroscopy is useful, if not essential, when analyzing a turbid sample, but can also measure a clear, transparent sample. Dual wavelength spectroscopy is also useful in situations where a reference system/cuvette is not available, such as looking at whole tissue in organisms where there is no true identical reference, where a reference system may change in a much different kinetic manner than the sample, where material is scarce and not available for a reference, or where it is impossible or undesirable to have a reference, such as measurement of light in inaccessible places (a form of remote sensing). For example, when one measures the absorbance of hemoglobin in a living organism's artery, there is no reference. With dual wavelength spectroscopy, a "reference" signal is obtained from the same sample as the "sample" signal, but at a different wavelength. The so-called reference wavelength chosen is one where the compound or effect being measured has no absorbance. At that reference wavelength the sample acts as its own reference compared to the measuring wavelength.

The dual wavelength spectrophotometer is inherently more expensive than the dual beam spectrophotometer since the dual wavelength spectrophotometer necessarily includes more monochromators. Others have recognized that it would be desirable to combine the two instruments into one. As such, there are several examples of dual wavelength spectrophotometers that may be adapted to operate as more simpler, split beam spectrophotometers. See, for example, U.S. Pat. Nos. 3,927,944; 3,924,949; and 3,712,738. See also, "Sensitive Absorption Spectrophotometer for Use As A Split Beam or As a Dual Wavelength Instrument," R. Rikmenspoel, *Review of Scientific Instruments*, Vol. 36, No. 4, April 1965, Pages 4, 9, 7–503.

Despite the adaption of dual wavelength spectrophotometers to operate as dual beam instruments, there remains an unfulfilled need for adapting dual beam instruments to operate as dual wavelength instruments. There are believed to be a larger population of dual beam machines in existence than there are dual wavelength machines. Users of such dual beam machines on occasion may require the more sophisticated measurement techniques available only in dual wavelength machines. Hence, such users would desire a means for adapting the less expensive dual beam machines to occasionally operate as dual wavelength machines.

SUMMARY OF THE INVENTION

The invention converts a dual beam machine into a dual wavelength machine. The conversion is easily and economically accomplished by providing the dual beam machine with a moveable beam stop operable for blocking the reference beam. The instrument is further provided with a suitable entrance port for receiving an injected beam from any suitable external source, such as a laser or a conventional lamp with a monochromator and slits to yield a column of light. The injected beam is injected into the optical path of the sample. A rotating mirror inside the dual beam machine, commonly known as a chopper, normally functions to alternately pass either the reference beam or the sample beam to the common photodetector.

The dual beam instrument is converted into dual wavelength operation by moving the beam stop into the reference optical path and blocking the reference beam from striking the photo detector. The injected beam of another wavelength is disposed in alignment with the sample optical path and the opposite side of the chopper mirror. During the sample cycle, the chopper mirror normally reflects the sample beam onto the first sample mirror and into the sample for later detection by the photod detector. The injected beam is reflected from the rear reflective surface of the mirror segment. As the mirror turns into the next segment, the injected beam passes through the transmissive segment of the chopper and it strikes the sample. The reference beam is blocked by the beam stop.

The photodetector and the signal processing system operate normally without further modification. The photodetector and signal processor receive alternating signals. The results of these signals can be compared without further changes in the machine. However, the results now will indicate a comparison of absorbance at two different wavelengths, namely the first source within the spectrophotometer and the second source from the injected beam. Since these two beams will be of different wavelengths, the dual or split beam spectrophotometer is thus temporarily, economically and effectively converted to dual wavelength operation.

Further modification may be made to the dual beam convertible spectrophotometer in order to enhance its performance during dual wavelength operation. In particular, it is desirable to provide a fiber optic connecting between the source of the injected beam and the chopper. This fiber optic connection may consist of a fiber optic cable with a lens at each end. One lens is disposed adjacent the second source; the other lens is disposed proximate to the mirror. Another fiber optic connection may be made between the sample and the photodetector. As mentioned before, dual wavelength instruments are commonly used with samples having high turbidity. Since a turbid sample scatters light, it is best to position a detecstor as close as possible to the sample. In commercially available dual beam machines the detector is often spaced from the sample. As such, turbid samples are normally not used in dual beam machines. However, in the converted machine, one may dispose a light pipe or a fiber optica cable between the sample and the photodetector. This further modification will prove helpful in obtaining more precise measurements of turbid samples.

The converted instrument can measure kinetics and absorbances at the measuring and injected wavelengths. The sample beam wavelength can be varied (as in the split beam mode) while the injected beam is maintained to make the instrument a scanning dual wavelength machine. The first and second derivatives can be obtained electronically. The first derivative can also be obtained directly if a variable wavelength source (such as a lamp and monochromator) is swept or scanned at the same scan rate as the sample beam but is slightly displaced in its starting wavelength. The injected beam could be swept by use of a small stepper or regular motor. The resulting data output will be the first derivative signal of the absorbance spectrum.

DETAILED DESCRIPTION OF THE INVENTION

There are several factors that contribute to the remarkable operation of the modified dual beam dual wavelength instrument.

1. Light scattered from the sample and/or reference is collected by a fiber optical bundle placed immediately at the surfaces of the sample/reference to gather as much scattered light as possible and to prevent any stray or unwanted light that did not pass through the sample from reaching the detector. The usual mirror arrangement of transmitting light from the samples to the detector allows any stray light that finds its way to any element between the sample and detector to reach the detector. Further, the absence of reflective elements beyond the sample/reference will result in less dispersive stray light generated at those surfaces.

Stray light is that light that either does not go through the sample but makes it to the detector (another component of stray light is those wavelengths not desired). Stray light's intensity is measured by using a highly absorbing sample. Stray light intensity may not be constant at all wavelengths and can be measured at any wavelength, although the stray light (SL) measurements at 220 nm are commonly reported.

A highly absorbing sample will have a very low value of I, intensity of light transmitted through the sample. The value of the reference intensity Io is obtained in dual beam mode in the absence of any absorbing material.

$$A = \log[(Io+SL)/(I+SL)];$$

as I approaches a value of zero due to the highly absorbing sample, $$A = \log[(Io+SL)/SL].$$

If SL<<<Io then the equation reduces to (for all practical uses)

$$A = \log[Io/SL]$$

Values of stray light yielding absorbance values of 3-4 are not uncommon. The stray light absorbance value for the Varian DMS-100, for example, is 3.8; 0.02% of the light detected is stray light. This is essentially 2 stray light photons per 10,000 photons reference.

Stray light originates from two sources, the monochromator and the other optical elements in the system. Gratings in particular are primary sources of stray light due to non-linear grooves and/or non-smooth groove surfaces in the grating. Stray light is more pronounced in ruled gratings rather than in halographic gratings where "chatter" and other motion-induced variations in the ruled groove can occur. Stray light is substantially reduced in holographic gratings that result from the interference patterns of two coherent monochromatic laser sources.

The second source of SL is from reflections and transmission of light from the lamp and from mirrors and reflective/refractive surfaces in the light path of the instrument. Light from the lamp compartment may leak into the optical path region and be an unwanted source of light of numerous wavelengths. In addition, some non-directional reflection of light (not in the direction of the original light beam) will occur at each reflective surface, particularly focusing mirrors; this non-directional (all-directional) reflection in due to imperfections or small inclusions in the mirror itself, the surface, surface coatings, etc. SL generated at one surface can be reflected at other surfaces (mirrors or the optical compartment wall) in the optical system.

2. The reference wavelength is chosen such that its absorbance by the sample either does not occur or occurs at a constant value (ignoring scattering changes for the moment). The reference wavelength is usually 10-100 nm away from the absorbance maximum wavelength of the sample. Thus if a narrow bandwidth light beam with its wavelength different from the sample beam's wavelength strikes a sample, the intensity of the reference beam, Io, is not decreased because the sample doesn't absorb these wavelengths of light!

In contrast, examine the instrument in dual beam mode. During the reference cycle, wavelength-max (the wavelength maximum value) passes through the reference, which merely absorbs LESS of that light than does the sample! Some light is absorbed by the reference sample and so Io is less than it could be. In the next segment of the cycle, the same wavelength light hits the sample where considerable absorbance occurs. Thus the Io/I ratio is less in a dual beam than in a dual wavelength instrument.

So how does a decreased stray light effect this? If both reference and measuring beams pass through the same sample, and if the reference beam is at a non-absorbing wavelength, then the possibility of a stray wavelength in the reference-stray-light hitting the sample and being absorbed is decreased. The effect is that Io is not decreased, but is actually greater than it would be in dual beam mode; thus, Io increases the log of Io/SL will increase (this is exactly what is measured in the dual wavelength mode; in dual wavelength, the stray light absorbance is 4.8–5.2A, yet in the dual beam mode, the stray light is 3.8A). The fact that the stray light wavelengths of the reference beam, if they were to get to the sample, could not and will not be absorbed by the sample, keeps the value of Io high, regardless of the stray light characteristics of the mother machine. The greater the spectral overlap between the sample absorbance bands (spectrum) and the reference beam spectral bandwidth (the wavelengths of the reference beam), the less the value of Io; conversely, the less the overlap, the greater the value of Io and the greater the apparent stray light absorbance value (less stray light). See also FIGS. 8a and 8b.

3. Stray light comes from "stray light" and also light that is not the desired wavelength. Stray light in the inserted reference beam is less than in the optical beam of the parent mother unit because:

a. There are fewer mirrors in the reference beam path to allow for reflective dispersion and light scattering. Light from the laser or monochromator is focused onto the optical fiber which transmits the light to the chopper; no other optical elements of the mother unit prior to the chopper are used. Also, the only light that can exit the fiber is that which is focused into it; in other words, stray light from lamps, room lights, etc cannot be in the reference beam (its spectral bandwidth is very narrow).

b. Because the second injected beam is focused into the optical fiber, the bandwidth (different wavelengths around the chosen wavelength) is very narrow. Light leaves the monochromator slits radially; as a result, wavelengths of light at the center of the light beam (which are the chosen wavelength and those close to it) are preferentially focused into the fiber. Those wavelengths further from the chosen value (at the edges of the slit beam) will not be focused to the same point and thus will not be passed into the fiber; the light in the fiber will have a narrower bandwidth that the beam being injected into the fiber. This in turn means that the intensity of light at the desired reference wavelength is higher than in dual beam mode and the Io/SL ratio increases.

4. The intensity of the reference beam is constant. Thus, the intensity of the reference signal from the detector is constant, reducing fluctuations in the noise and response time of the electronics. As a result of this electronic stabilization, the signal/noise ratio is better.

5. The size of a light beam at the chopper of a dual beam instrument may be as large as approximately 1 inch×1 inch. The size of the injected beam from the light pipe and collimating lens is approximately $\frac{1}{8}$–174" in diameter. Thus, during the reference cycle of the instrument, the intensity of the reference beam and corresponding electrical signal are at constant maximal value for a longer time period. Thus the integrated signal is larger and more stable. This will result in stability and a better signal/noise ratio. See also FIG. 8c.

Choppers more through a beam of light. The most common chopper is a wheel with an open port, a mirrored port to reflect to one of the sample/reference, and a black opaque segment for dark current. The size of the beam (cross-sectional area) in many, if not most, instruments is on the order of 20–30% of the size of the opening port or reflective mirror surface. Thus, the light intensity at or through the port or surface and the voltage/current generated by the beam appears as in FIG. 8d.

The resulting curve represents the intensity of light or signal. The instrument "reads" the intensity where the beam intensity or signal is constant, in the region of the curve marked "R". The larger the cross-sectional area of the beam compared to the size of the duty cycle/chopper segment, the shorter the time during which the signal is levelled off or consistent. The longer the "recording or reading time", the more accurate the measurement of the signal. Since the signal intensity is integrated (represents the integral if the intensity during this time), the longer the sampling time, the greater the signal, the greater the signal/noise ratio, and the more accurate and reproducible the signal measured.

All of these contribute to the high performance of this instrument. One of the most important characteristics is the decrease in stray light and the narrow bandwidth of the injected beam. This, along with the stability and longer measuring period ofthe reference cycle, contribute to higher resolution and to an effective overall 10-fold decrease in stray light.

DETAILED DESCRIPTION OF THE DRAWINGS

Figure 1:
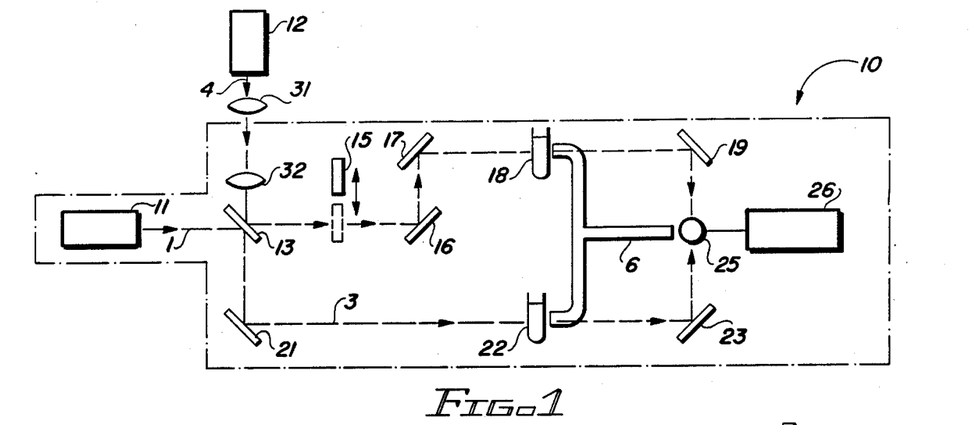
FIG. 1 is a schematic diagram of the optical train of a spectrophotometer of the present invention.

In FIG. 1 there is generally shown a dual beam spectrophotometer 10 enclosed with a dashed outline. A first light source 11 provides an incident beam of light to a chopper 13. The chopper 13 is a rotating disk having alternate reflecting and transmissive segments. The back surface of the reflective segments are blackened to absorb and block incident light. The chopper 13 divides the incident beam 1 into separate beams that pass along a reference optical path 2 indicated in dashed lines and a sample path 3 indicated in solid lines.

Those skilled in the art will understand that other kinds of choppers may be useful in the invention. Any chopper that alternates mirrors or ports with a circular disk or oscillating vanes such as turning forks would suffice. Regardless of the device, the chopper functions to allow first the sample beam and then the injected beam to pass along the light path. So, while one beam is transmitted, the other will be reflected or otherwise blocked.

The reference path 2 comprises first and second reference mirrors 16, 17. Those mirrors direct the reference beam through a reference 18 onto a third reference path mirror 19. That mirror 19 in turn directs the reference beam to a detector 25. A signal processor 26 is electrically connected to detector 25, a photodetector which generates an electrical signal in proportion to received light. The electrical signals are transmitted to signal processor 26 where their results can be mathematically or otherwise processed and compared with other signals in accordance with well known techniques.

A moveable beam stop 15 is disposed adjacent to the reference optical path 2 between the chopper 13 and the first mirror 16. The beam stop 15, as indicated by the double headed arrow adjacent beam stop 15, is moveable between two positions. One position is out of the path of reference path 2; the other position is across the optical 2 for interrupting beam 1 in its passage along optical path 2.

Beam 1 alternately travels along sample optical path 3. Reflective segments of chopper 13 direct beam 1 onto sample mirror 21. From sample mirror 21 the beam passes through a sample 22. The light emerging from sample 22 is reflected by sample mirror 23 onto detector 25. Light falling upon detector 25 from sample 22 generates electrical signals that are processed by signal processor 26.

A second light source 12 is provided for generating an injected beam 4 of a wavelength different from the wavelength of beam 1. Beam 4 may be injected through a suitable slit or other means provided in the walls of spectrophotometer 10. In the preferred embodiment, beam 4 is transmitted to chopper 13 by means of the optical path more particularly shown in FIG. 2.

Figure 2:
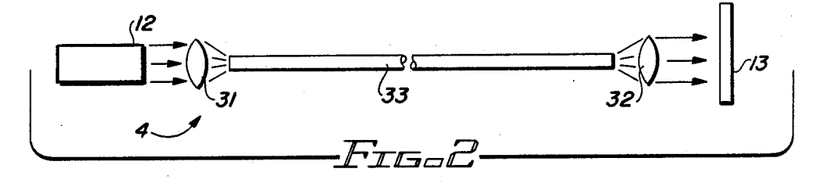
FIG. 2 is a schematic diagram of the optical connection between the second source and the chopper of the spectrophotometer of the present invention.

With reference to FIG. 2, the second source 12 is a laser or a conventional light source coupled with a monochromator for generating a collimated beam of light. The output of second source 12 is received by a lens 31 that is coupled to a fiber optic cable 33. The other end of fiber optic cable 33 is terminated in a lens 32. Light emerging from lens 32 is directed to the chopper 13 in line with sample path 3.

The invention provides an alternate light path 6 for light transmitted through sample 22. As mentioned above, certain sample material may have high turbidity and light may be scattered. In order to improve precision of absorption readings, it is preferable to move the detector 25 as close as possible to the sample 22. Since dual beam instruments normally have fixed light paths, i.e. mirror 23, a further modification is available with the invention. This modification is more particularly shown in FIG. 3 and is similar to the connection shown in FIG. 2.

Figures 3, 4:
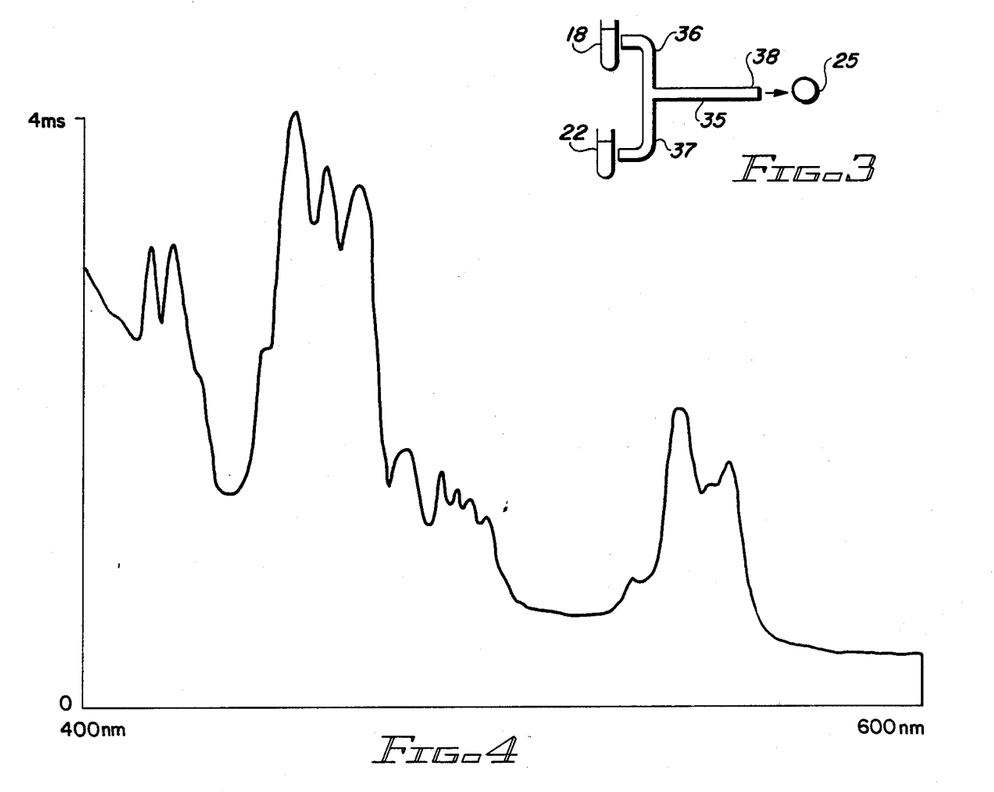
FIG. 3 is a schematic diagram of the optical connection between the sample and the photo detector of the spectrophotometer of the present invention.
FIG. 4 is a plot of the signal received using a Johnson Research Foundation spectrophotometer model DBS-3 on holmium oxide powder in epoxy for the wavelength band of 400 nm to 600 nm.

More specifically, a light pipe or fiber optic cable 35 has its bifurcated ends 36, 37 disposed between the reference 18 and sample 22 and detector 25. The common end 38 is placed near the detector 25 so the cone of light (no lens is needed) illuminates the detector surface. The bifurcated ends 36, 37 are used at the sample 22 and reference 18 cuvettes. One end 36 is proximate the reference; the other end 37 is proximate the sample. With both cuvettes 18, 22 "light-piped" to the detector 25, the light path of both beams is the same. Once the pipe 35 is installed, it need never be moved again. Variable slits (not shown) can be placed on the exit side of the cuvettes 18, 22 to balance the intensity of the beams. Collimating lenses between the cuvettes 18, 22 and the light pipe 35 can be used, but in the operation of the preferred embodiment it was found unnecessary. Simple placing the bifurcated ends 36, 37 of the light pipe 35 next to the cuvettes 18, 22 worked well. Each optical element in the path can be expected to reduce the intensity by about 4%. So, keeping the number of elements at a minimum is beneficial. If the bifurcated light pipe 35 is used, it is permanently mounted and all that must be moved to convert from one mode to another is the beam stop 15. Use of the bifurcated pipe 35 in the split beam mode will, by itself, allow the instrument to measure samples of higher turbidity than it could formerly.

In normal dual beam operation, the light beam 1 is alternately passed along reference path 2 and sample optical path 3. The chopper 13 switches the beam 1 along those paths 2, 3. As transmissive segments of chopper 13 cross beam 1, the beam passes through the transmissive segments along optical path 2 to the photodetector 25. When the reflective segment crosses the path of beam 1, the beam is diverted along optical path 3 to the sample 22 and from there to photodetector 25. As such, during normal dual beam operation, the chopper 13 alternately directs incident beam 1 along alternate, separate optical paths 2, 3.

The instrument 10 is converted to dual wavelength operation by moving the beam stop from its position off of optical path 2 into the path 2 for interrupting and stopping the passage of beam 1 along reference optical path 2. At the same time, the beam 4 generated by a second source 12 is directed to the surface of chopper 13 that is opposite the incident surface of beam 1. Beam 4 is optically aligned with the portion of the sample optical path 3 disposed between chopper 13 and sample mirror 21.

As a transmissive segment of chopper 13 crosses beam 1, beam 1 passes through the transmissive segment but is interrupted and blocked by beam stop 15. Simultaneously, beam 4 from second source 12 is transmitted through chopper 13 and along optical path 3 of the sample 22. Light emerging from sample 22 is coupled via optical path 6 to the detector 25. Thus, the signal appearing at the detector 25 during the normal reference portion of the instrument is a signal generated by beam 4 of a wavelength different from beam 1.

As chopper 13 turns a reflective surface of a segment intercepts beam 1 and directs it along path 2. The blackened, rear segment surface absorbs beam 4. Beam 1 travels along its normal sample optical path 3. Light emerging from sample 22 is coupled via optical path 6 to photodetector 25. In this manner, the sample portion represents a signal taken at a separate distinct wavelength, i.e. the wavelength of beam 1.

As such, photodetector 25 alternately receives signals of light intensity generated by wavelengths of light of different frequencies. As such, the signal received at photodetector 25 is the result of light beams of two different wavelengths that pass through sample 22. The dual beam instrument is thereby converted into a dual wavelength instrument.

The above is a description of the preferred embodiment of the invention. Those skilled in the art will appreciate that further modifications, alterations, and additions may be made to the invention without departing from the spirit and scope of the invention as defined in the following claims.

Those skilled in the art will see that the relative positions of the first and second sources 11, 12 may be reversed. In such a case, suitable changes can be made in the chopper 13 and other elements along the optical paths 2, 3 to accommodate the changed positions of the sources 11, 12.

Those skilled in the art will also appreciate that chopper 13 is not essential for alternating the injected beam. In the foregoing description the chopper 13 directly synchronizes the injected beam 4 with the reference beam by disposing the second source 12 behind the chopper 13. However, the second source could be disposed at any other convenient position along the second optical path 3 and synchronized to the blocked reference beam by other means. For example, a switched laser (now shown) could be fired during the reference cycle in response to a synchronous signal received from the chopper. So, while the invention provides for alternately and cyclically illuminating the sample with beams from the first source and the injected source, synchronizing the two beam may be accomplished by means other than the chopper 13. Of course, the chopper 13 is preferred because it provides such a synchronizing function without further modification.

Referring to the plot illustrated in FIG. 4. The sample being assayed is holmium oxide powder in epoxy using a Johnson Research Foundation (University of Pennsylvania) spectrophotometer DBS-3. This instrument operates in dual wavelength mode. For the targeted wavelengths of 400 nm to 600 nm, a generalized form is created. This waveform has rounded peaks and valleys making it difficult to identify. The DBS-3 markets for some thirty thousand dollars.

FIG. 4 is used to illustrate the lack of resolution that the existing art generates. This lack of resolution makes it difficult if not impossible to identify an unknown sample with any degree of certainty.

Figure 5A:
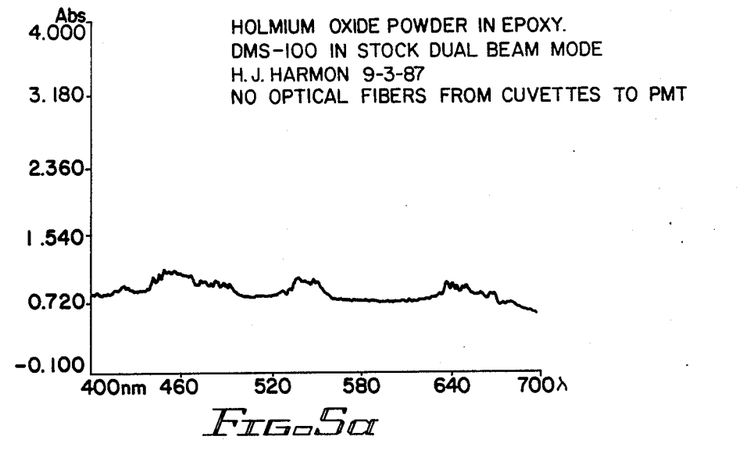
FIGS. 5a, 5b, and 5c are plots generated by different embodiments of the invention on holmium oxide powder in epoxy.

FIG. 5a is the plot generated using a Varian DMS 100 spectrophotometer operating in dual beam mode with a holmium oxide powder in epoxy sample. Although some peaks are discernable, the overall plot is still without much resolution.

Figure 5B:
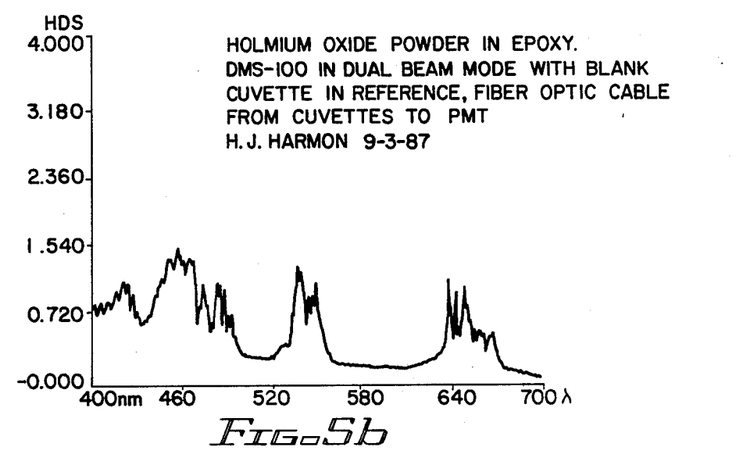

FIG. 5b utilizes the same machine still operating in dual beam mode except that the bifurcated fiber optic cable from the sample and reference cuvettes has been installed to take the beam therefrom to the photo-multiplier. The sample is the same holmium oxide powder in epoxy. The resolution obtained is much greater than that found in FIG. 5a. This creates a fingerprint that is much easier to identify. Note though that the magnitude of the signal is relatively low with slight variations.

Figure 5C:
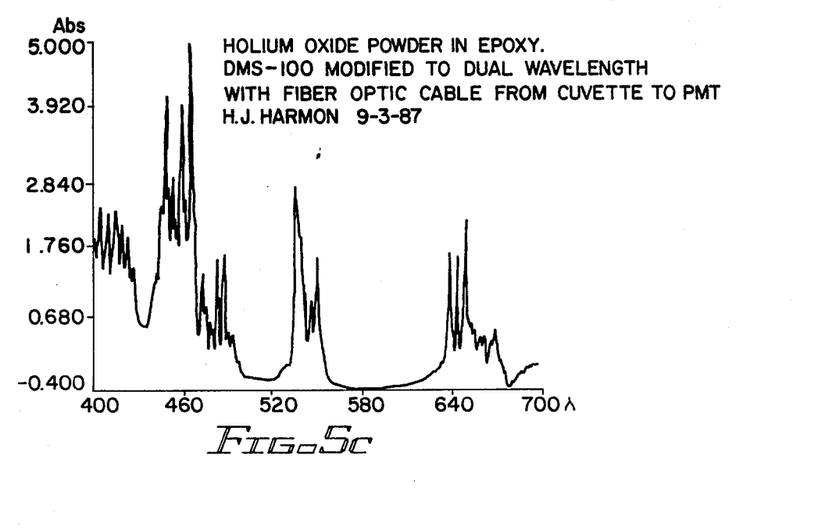

If the same machine described in FIG. 5b is converted to operate in dual wavelength mode, as described earlier, the same sample of holmium oxide in powder generates a very dramatic plot, as seen in FIG. 5c. Not only are heretofore unidentifiable peaks made obvious, but the magnitude of the peaks is much greater.

It is due to the present invention that this dramatic result can be obtained.

By comparing the results of the inexpensive, eleven to twelve thousand dollars, DMS 100 (FIG. 5c) as modified, to the expensive DBS 3 (FIG. 4), it is clear that the present invention provides for much higher resolution enabling the machine to address a much broader and varied range of identification problems.

Similar resolution can be obtained using a more expensive Varian spectrophotometer such as the Varian 2300 (again in the thirty thousand dollar range). The plot of FIG. 6 illustrates just such an analysis as performed on holmium oxide powder in epoxy.

Figure 7:
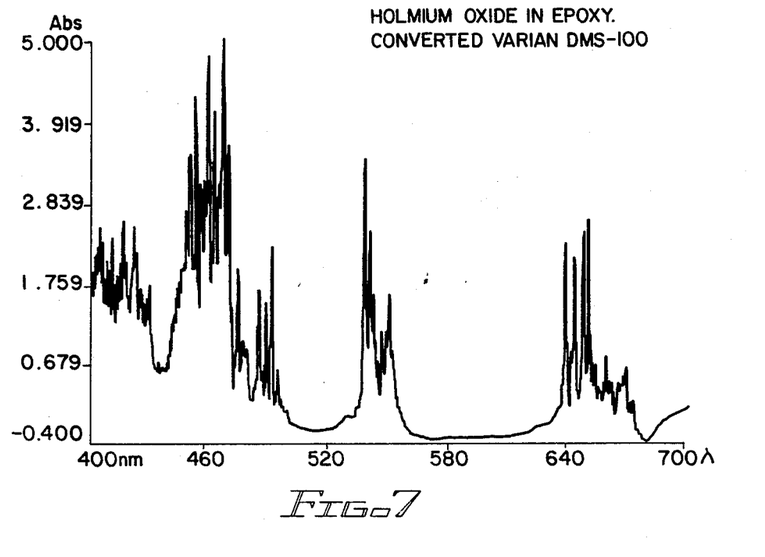
FIG. 7 is a plot of the signal from a Varian model DMS 100 modified according to the present invention and operating on holmium oxide over the wavelength of 400 nm to 700 nm.

Yet even this machine, the Varian 2300, does not give the resolution indicated by the plot of FIG. 7, illustrating the modified DMS 100. This latter machine of FIG. 7, utilizing the present invention's conversion to operate in dual wavelength, yields better resolution than found in the Varian 2300.

Figure 6:
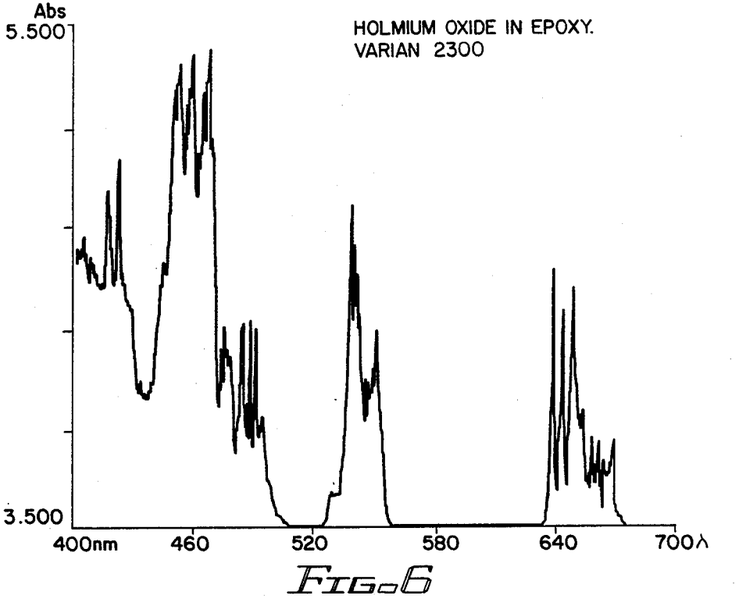
FIG. 6 is a plot of the signal from a Varian model 2300 on holmium oxide in epoxy for the wavelength of 400 nm to 700 nm.

As example, analyzing the first cluster of peaks of FIG. 6 to FIG. 7, the number of peaks identifiable on the Varian 2300 (FIG. 6) compared to the number of identifiable peaks using the present invention (FIG. 7) is astounding. This higher resolution is even more amazing when it is realized that the total cost of the base machine, a DMS-100, with modification is approximately half the cost of the machine giving the results of FIG. 6.

It is clear from the foregoing that the present invention creates a spectrophotometer giving totally unexpected results and providing the ability to retro-fit or convert existing machines to obtain resolution heretofore unavailable.

Figure 8A:
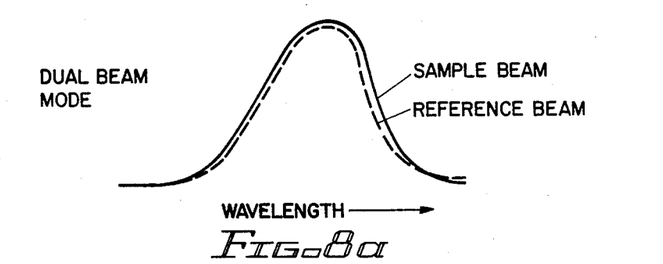
FIGS. 8a, 8b, 8c, and 8d graphically illustrate various aspects of the present invention.
Figure 8B:
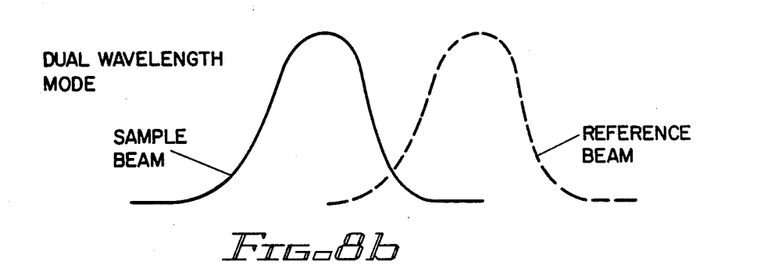

FIGS. 8a and 8b illustrate an important concept in stray light control. If both reference and measuring beams pass through the same sample, and if the reference beam is at a non-absorbing wavelength, then the possibility of a stray wavelength in the reference-straylight hitting the sample and being absorbed is decreased. The effect is that Io is not decreased, but is actually greater than it would be in dual beam mode; thus, Io increases and the log of Io/SL will increase (this is exactly what is measured in the dual wavelength mode; in dual wavelength, the stray light absorbance is 4.8–5.2A, yet in the dual beam mode, the stray light is 3.8A). The fact that the stray light wavelengths of the reference beam, if they were to get to the sample, could not and will not be absorbed by the sample, keeps the value of Io high, regardless of the stray light characteristics of the mother machine. The greater the spectral overlap between the sample absorbance bands (spectrum) and the reference beam spectral bandwidth (the wavelengths of the reference beam), the less the value of Io; conversely, the less the overlap, the greater the value of Io and the greater the apparent stray light absorbance value (less stray light).

Figure 8C:
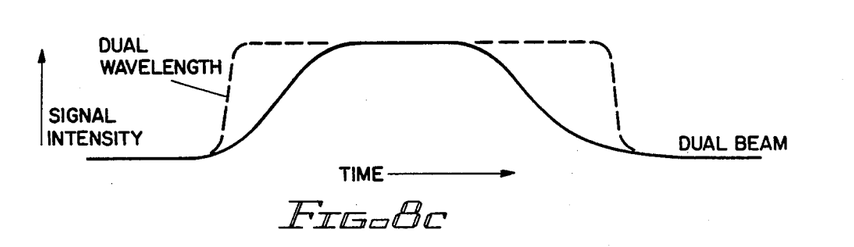
Figure 8D:
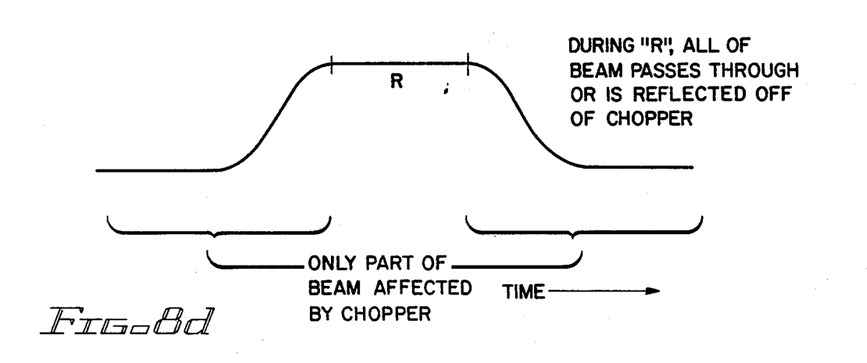

FIG. 8c, illustrates considerations for the beam chopper size. The size of a light beam at the chopper of a dual beam instrument may be as large as approximately 1 inch×1 inch. The size of the injected beam from the light pipe and collimating lens is approximately ⅛-174 " in diameter. Thus, during the reference cycle of the instrument, the intensity of the reference beam and corresponding electrical signal are at constant maximal value for a longer time period. Thus the integrated signal is larger and more stable. This will result in stability and a better signal/noise ratio.

Refering to FIG. 8d, Choppers move through a beam of light. The most common chopper is a wheel with an open port, a mirrored port to reflect to one of the sample/reference, and a black opaque segment for dark current. The size of the beam (cross-sectional area) in many, if not most, instruments is on the order of 20–30% of the size of the opening port or reflective mirror surface. Thus, the light intensity at or through the port or surface and the voltage/current generated by the beam appears as in FIG. 8d.

The curve represents the intensity of light or signal. The instrument "reads" the intensity where the beam intensity or signal is constant, in the region of the curve marked "R". The larger the cross-sectional area of the beam compared to the size of the duty cycle/chopper segment, the shorter the time during which the signal is levelled off or consistent. The longer the "recording or reading time", the more accurate the measurement of the signal. Since the signal intensity is integrated (represents the integral if the intensity during this time), the longer the sampling time, the greater the signal, the greater the signal/noise ratio, and the more accurate and reproducible the signal measured.

It is clear from the forgoing that the present invention creates a spectrophotometer giving totally unexpected results and providing the ability to retro-fit or convert existing machines to obtain resolution heretofore unavailable.

What is claimed is:

1. A retrofit conversion means for converting a dual beam spectrophotometer having a sample cycle and a reference cycle to a dual wavelength spectrophotometer, where the dual beam spectrophotometer has a first light source for generating a first beam of light of preselected wavelength, first and second optical paths, a detector means, synchronous means for cyclically alternating said first beam between said first and second optical paths, and sample and reference receiving means disposed in said first and second optical paths respectively, said retrofit conversion means comprising:
   a. a second light source for generating a second beam of light of a preselected second wavelength;
   b. means for transmitting said second beam from said source to said first optical path;
   c. means for injecting said second beam into said first optical path during the reference cycle with the first beam from the first light source and the injected beam from the second light source cyclically transmitted along said first optical path to said sample; and,
   d. means for blocking the second optical path and preventing transmission of light therethrough.

2. The retrofit conversion means of claim 1 wherein the blocking means comprises a beam stop disposed in the second optical path.

3. The retrofit conversion means of claim 1 wherein the second light beam from said second light source is injected into the synchronous means for transmission along said first optical path.

4. The retrofit conversion means of claim 1 wherein the synchronous means comprises a chopper having alternating reflective and transmissive segments.

5. The retrofit conversion means of claim 4 wherein the optical paths of the first light beam and the injected second beam are disposed on opposite sides of the chopper.

6. The retrofit conversion means of claim 1 further comprising means for blocking the injected second light beam during the sample cycle.

7. The retrofit conversion means of claim 1 wherein said second light source generates monochromatic light for the injected second light beam.

8. The retrofit conversion means of claim 7 wherein the second light source comprises a lamp and monochromator for passing an output light beam having a preselected wavelength.

9. The retrofit conversion means of claim 7 wherein the second light source comprises a lamp and a filter for passing an output light beam having a preselected wavelength.

10. The retrofit conversion means of claim 7 wherein said means for transmitting said second light beam further comprises a fiber optic means for conveying the output light beam of the second light source to the synchronous means.

11. The retrofit conversion means of claim 7 wherein the second light source comprises a laser.

12. The retrofit conversion means of claim 1 further comprising a first elongated optical fiber cable optically connecting the sample receiving means and the detector means.

13. The retrofit conversion means of claim 12 further comprising a second optical fiber cable optically connecting the optical output from the reference receiving means to the detector means.

14. The retrofit conversion means of claim 1 wherein the dual beam spectrophotometer has a housing with walls and wherein the means for injecting includes a slit in said housing for admitting light into said housing from said second light source mounted outside said housing.

15. The retrofit conversion means of claim 14 wherein said means for injecting further comprises an optical fiber means for optically coupling said second light source to the synchronous means.

* * * * *